United States Patent [19]

Comer

[11] Patent Number: 5,508,318
[45] Date of Patent: Apr. 16, 1996

[54] COMPOSITIONS OF IRRADIATED AND NON-IRRADIATED OLEFIN POLYMER MATERIALS WITH REDUCED GLOSS

[75] Inventor: Jerome P. Comer, Shorewood, Ill.

[73] Assignee: Montell North America Inc., Wilmington, Del.

[21] Appl. No.: 92,345

[22] Filed: Jul. 15, 1993

[51] Int. Cl.$^6$ .............................. C08J 3/28; C08L 23/10; C08L 23/16; C08L 23/04; C08L 53/00

[52] U.S. Cl. .............................. 522/112; 525/88; 525/89; 525/240; 522/157; 522/158; 522/161

[58] Field of Search .............................. 525/89, 88, 240; 522/112, 109, 157, 158, 161

[56] References Cited

U.S. PATENT DOCUMENTS

| | | |
|---|---|---|
| 3,717,559 | 2/1973 | Oyama et al. . |
| 4,170,664 | 10/1979 | Spenadel et al. . |
| 4,626,467 | 12/1986 | Hostetter . |
| 4,916,198 | 4/1990 | Scheve et al. . |
| 5,047,446 | 9/1991 | DeNicola, Jr. . |
| 5,047,485 | 9/1991 | DeNicola, Jr. . |
| 5,116,881 | 5/1992 | Park et al. . |
| 5,212,246 | 5/1993 | Ogale .................. 525/323 |
| 5,286,552 | 2/1994 | Lesca et al. ........... 525/323 |
| 5,286,564 | 2/1994 | Cecchin et al. ........ 525/323 |

FOREIGN PATENT DOCUMENTS

| | | |
|---|---|---|
| 0124722A3 | 11/1984 | European Pat. Off. . |
| 0190889A3 | 8/1986 | European Pat. Off. . |
| 0477662A2 | 4/1992 | European Pat. Off. . |
| 0518455A2 | 12/1992 | European Pat. Off. . |

OTHER PUBLICATIONS

L. Spenadel, "Radiation Crosslinking of Polymer Blends", Radiat. Phys. Chem. vol. 14, pp. 683–697, 1979, discloses radiation crosslinking of ethylene–propylene/polyolefin blends.

*Primary Examiner*—Carman J. Seccuro, Jr.

[57] ABSTRACT

Disclosed is a polyolefin composition comprising (A) an irradiated, normally solid, high molecular weight, amorphous to predominantly crystalline olefin polymer material and (B) a non-irradiated propylene polymer material or a mixture thereof with an olefin copolymer rubber.

The polyolefin composition of this invention also provides improved retention of embossing definition commonly referred to as grain retention, when the composition is extruded and embossed, with or without subsequently thermoforming.

18 Claims, No Drawings

COMPOSITIONS OF IRRADIATED AND NON-IRRADIATED OLEFIN POLYMER MATERIALS WITH REDUCED GLOSS

FIELD OF THE INVENTION

This invention relates to a polyolefin composition and more specifically to a polyolefin composition comprising (A) an irradiated, normally solid, high molecular weight, amorphous to predominantly crystalline olefin polymer material and (B) a non-irradiated propylene polymer material or a mixture thereof with an olefin copolymer rubber.

BACKGROUND OF THE INVENTION

Olefin polymer materials, in particular propylene polymer materials, have been widely used in various applications, such as fibers, films, sheets and other shaped articles, because of their excellent physical and mechanical properties. However, some of the olefin polymer materials have been found undesirable for applications requiring low gloss, such as thermoforming, extrusion coating, blow molding, injection molding and sheet or film extrusion, because of their high gloss after processing. The high gloss of these processed parts interferes with applications, such as painting, over said parts.

Thus, there is a need in the industry for olefin polymer materials having low gloss after processing, and which substantially retain their physical and mechanical properties.

SUMMARY OF THE INVENTION

It has been found that by blending an irradiated, normally solid, high molecular weight, amorphous to predominantly crystalline olefin polymer material with a nonirradiated propylene polymer or a mixture thereof with an olefin copolymer rubber, a composition is obtained having reduced gloss, improved thermoformability, calendering and blow molding properties.

Accordingly, there is provided a polyolefin composition consisting essentially of (A) from 5 to 95% by weight of an irradiated, normally solid, high molecular weight, amorphous to predominantly crystalline olefin polymer material, the molecular chains of which have a substantial amount of free-end long branches, a branching index of less than 1 and has significant strain hardening elongation viscosity, and (B) from 95 to 5% by weight of a non-irradiated propylene polymer material or a mixture thereof with an olefin copolymer rubber.

DETAILED DESCRIPTION OF THE INVENTION

All parts and percentages used in this application are by weight unless otherwise specified. Ambient or room temperature is approximately 25° C.

Component (A), an irradiated, normally solid, high molecular weight, amorphous to predominantly crystalline olefin polymer material used in the composition of the present invention is selected from the group consisting of:

(1) a homopolymer of propylene;

(2) an ethylene polymer material selected from the group consisting essentially of:

(i) homopolymers of ethylene having a density of 0.960 g/cm$^3$ or greater or a crystallinity of 85% or greater;

(ii) random copolymers of ethylene and an alpha-olefin selected from the group consisting of $C_3$–$C_{10}$ alpha-olefins having a polymerized alpha-olefin content of about 20%, preferably about 16%, and having a density of 0.915 g/cm$^3$ or greater or a crystallinity of 62.5% or greater, and preferably a density of 0.92 g/cm$^3$ or greater or crystallinity greater than 65.2%; and (iii) random terpolymers of ethylene and $C_3$–$C_{10}$ alpha-olefins, provided that the maximum polymerized alpha-olefin content is about 20%, preferably about 16%;

(3) a random copolymer of propylene and an olefin selected from the group consisting of ethylene and $C_{4-10}$ alpha-olefins, provided that, when said olefin is ethylene, the maximum polymerized ethylene content is about 5%, preferably about 4%, and when said olefin is a $C_{4-10}$ alpha-olefin, the maximum polymerized alpha-olefin content is about 20%, preferably about 16%;

(4) a random propylene terpolymer consisting essentially of:

(a) from 84 to 98% propylene, preferably from about 90 to 95%, most preferably from about 92 to 94%, (b) from 1 to 10% ethylene, preferably from about 2 to 5%, most preferably from about 2.2 to 3%, and (c) about 1 to 15% of a $C_{4-8}$ alpha-olefin, preferably from about 4 to 10%, and most preferably from about 4.4 to 6%, wherein the total comonomer concentration of said propylene terpolymer is from about 4 to 15%;

(5) an olefin polymer composition consisting essentially of:

(a) from 30 to 65%, preferably from about 45 to 65%, of a copolymer of propylene with a $C_{4-8}$ alpha-olefin, which contains from 80 to 98% propylene, and preferably from 85 to 95%, and (b) from about 35 to 70%, preferably from about 35 to 55%, of a copolymer of propylene with ethylene having an ethylene content of from 1 to 10%, preferably from 7 to 9%, or terpolymer of propylene with ethylene and a $C_{4-8}$ alpha-olefin, having a total comonomer content, i.e, of ethylene and a $C_{4-8}$ alpha-olefin, of from 2 to 10%, preferably 3 to 6%;

(6) an olefin polymer composition consisting essentially of:

(a) from 10 to 50% of a propylene homopolymer, preferably from 10 to 40%, and most preferably from 20 to 35%, having an isotactic index of from 80 to greater than 99%, and preferably from 85 to 99%, or a copolymer selected from the group consisting of (i) propylene and ethylene, (ii) propylene, ethylene and a $CH_2$=CHR alpha-olefin, where R is a $C_{2-8}$ straight or branched alkyl, and (iii) propylene and an alpha-olefin, as defined above in (a)(ii), wherein said copolymer contains from 85 to 99%, and preferably from 90 to 99% propylene and having an isotactic index greater than 80 to 98%, preferably greater than 85 to 98%, (b) from 5 to 20% of a semi-crystalline, essentially linear copolymer fraction, preferably from 7 to 15%, having a crystallinity of about 20 to 60%, by differential scanning calorimetry (DSC), wherein the copolymer is selected from the group consisting of (i) ethylene and propylene containing over 55% ethylene; (ii) ethylene, propylene, and an alpha-olefin, as defined above in (a)(ii), containing from 1 to 10% of the alpha-olefin and over 55% up to 98%, preferably from 80 to 95%, of both ethylene and alpha-olefin; and (iii) ethylene and an alpha-olefin, as defined in (a)(ii), containing over 55% up to 98%, preferably from 80 to 95%, of said alpha-olefin, which copolymer is insoluble in xylene at room or ambient temperature, and (c) from 40 to 80% of a copolymer fraction, preferably 50 to 70%, selected from the group consisting of a copolymer of (i) ethylene and propylene wherein the copolymer contains from 20% to less than 40%, preferably from 20 to 38%, most preferably 25 to 38% ethylene; (ii) ethylene, propylene, and an alpha-olefin, as defined in (a)(ii), wherein the alpha-olefin is present in an amount of from 1 to 10%, preferably from 1 to 5%, and the amount of ethylene and alpha-olefin present is from 20% to less than 40%; and (iii) ethylene and an alpha-olefin, as defined in (a)(ii), containing from 20 to less than 40%, preferably 20 to 38%, and most preferably 25 to 38% of the alpha-olefin, and optionally containing 0.5 to 10%, preferably 1 to 5% of a diene, said copolymer fraction being soluble in xylene at ambient temperature, and having an intrinsic viscosity preferably of from 1.7 to 3.0 dl/g, wherein the total amount of ethylene units or said alpha-olefin units in the olefin polymer composition or of ethylene and said alpha-olefin units when both are present in the olefin polymer composition is from 15 to 35%, the total amount of (b) and (c) fractions, based on the total olefin polymer composition is preferably from about 65% to 80%, the weight ratio of (b)/(c) is preferably from 0.1 to about 0.3 and the total content of ethylene or $C_{4-8}$ alpha-olefin or combination thereof in (b+c) is less than 50%, and preferably from 20 to 45%;

(7) a homopolymer of propylene or a random copolymer of propylene and an olefin selected from the group consisting of ethylene and $C_{4-10}$ alpha-olefins, provided that, when said olefin is ethylene, the maximum polymerized ethylene content is about 10%, preferably about 4%, and when said olefin is a $C_4$–$C_{10}$ alpha-olefin, the maximum polymerized alpha-olefin content is about 20%, preferably about 16%, impact modified with from 5 to 60% of an ethylene-propylene copolymer rubber having an ethylene content of from 20 to 70%, or an ethylene-propylene-non-conjugated diene monomer rubber having a diene content of from 2 to 8% and an ethylene content of from 20 to 70%;

(8) a thermoplastic olefin consisting essentially of:
  (a) from 10 to 60% of a propylene homopolymer, preferably from 20 to 50%, having an isotactic index greater than 90, preferably greater than 98%, or a crystalline propylene copolymer with ethylene and/or $C_{4-8}$ alpha-olefin having a propylene content greater than 85% and an isotactic index of greater than 85%;
  (b) from 30 to 60% of an amorphous ethylene-propylene copolymer fraction, preferably from 30 to 50%, optionally containing minor amount of a diene, which is xylene soluble at room temperature, and contains from 40 to 70% ethylene; and
  (c) from 8 to 40% of a semi-crystalline ethylene-propylene copolymer which is xylene insoluble at room temperature; and (9) mixtures thereof.

Preferably, component (A) is an irradiated, normally solid, high molecular weight, olefin polymer material of (A)(1), (A)(3), (A)(5) or (A)(6). Said component (A) is present in an amount of from 10 to 90%, preferably, and most preferably from 20 to 80% of the total composition.

Examples of suitable ethylene copolymers include ethylene/butene-1, ethylene/hexene-1, ethylene/octene-1 and ethylene/4-methyl-1-pentene. The ethylene copolymer can be a HDPE or a short chain branched LLDPE, and the ethylene homopolymer can be a HDPE or a LDPE. Typically the LLDPE and LDPE have densities of 0.915 g/cm³ or greater to less than 0.940 g/cm³ and the HDPE have densities of greater than 0.940 g/cm³, usually 0.950 g/cm³ or greater. In general, ethylene polymer materials having a density from 0.890 to 0.970 g/cm³ are suitable for the use in the practice of this invention.

Preferably, the ethylene polymer are LLDPE and HDPE having a density of from 0.915 to 0.970 g/cm³.

The irradiated, normally solid, high molecular weight, amorphous to predominantly crystalline olefin polymer material, used in the present invention, has a substantial amount of free-end long branches of the molecular chains a branching index of less than 1 and significant strain hardening elongation viscosity.

As used herein, "high molecular weight" means weight average molecular weight of at least about 50,000, preferably 100,000.

The branching index quantifies the degree of long chain branching. In preferred embodiments the branching index is preferably less than about 0.9, and most preferably about 0.2–0.8. It is defined by the equation:

$$g' = \frac{[IV]_{Br}}{[IV]_{Lin}}\bigg|_{M_w}$$

in which g' is the branching index, $[IV]_{Br}$ is the intrinsic viscosity of the branched olefin polymer material and $[IV]_{LIN}$ is the intrinsic viscosity of the corresponding, olefin polymer material, namely, normally solid, linear, olefin polymer material of substantially the same weight average molecular weight and, in the case of copolymers and terpolymers, substantially the same relative molecular proportion or proportions of monomer units.

Intrinsic viscosity, also known as the limiting viscosity number, in its most general sense is a measure of the capacity of a polymer molecule to enhance the viscosity of a solution. This depends on both the size and the shape of the dissolved polymer molecule Hence, in comparing a nonlinear polymer with a linear polymer of substantially the same weight average molecular weight, it is an indication of configuration of the nonlinear polymer molecule. Indeed, the above ratio of intrinsic viscosities is a measure of the degree of branching of the nonlinear polymer. A method for determining intrinsic viscosity of propylene polymer material is described by Elliott et al., J. App. Poly. Sci., 14, pp 2947–2963 (1970) and of ethylene polymer material is described in J. App. Poly. Sci., 21, pp 3331–3343. In this specification the intrinsic viscosity in each instance is determined with the polymer dissolved in decahydronaphthalene at 135° C.

Weight average molecular weight can be measured by various procedures. However, the procedure preferably used here is that of low angle laser light scattering photometry, which is disclosed by McConnell in Am. Lab., May 1978, in the article entitled "Polymer Molecular Weights and Molecular Weight Distribution by Low-Angle Laser Light Scattering".

Elongational viscosity is the resistance of a fluid or semifluid substance to elongation. It is a melt property of a thermoplastic material, that can be determined by an instrument that measures the stress and strain of a specimen in the melt state when subjected to tensile strain at a constant rate. One such instrument is described in, and shown in FIG. 1 of, Munstedt, J. Rheology, 23, (4), 421–425, (1979). A commercial instrument of similar design is the Rheometrics RER-9000 extensional rheometer. Molten, high molecular weight, olefin polymer material exhibits elongational viscosity which, as it is elongated or drawn at a constant rate from a relatively fixed point, tends to increase for a distance dependent on the rate of elongation, and then to decrease rapidly until it thins to nothing—so-called ductile or necking failure. On the other hand, the molten olefin polymer material of this invention, that is of substantially the same weight average molecular weight and at substantially the same test temperature as the corresponding, molten, high molecular weight, olefin polymer material, exhibits elongational viscosity which, as it is elongated or drawn from a relatively fixed point at substantially the same rate of elongation tends to increase over a longer distance, and it breaks or fails by fracture—so-called brittle or elastic failure. These characteristics are indicative of strain hardening. Indeed, the more long chain branching the olefin polymer material of this invention has the greater the tendency of the elongational viscosity to increase as the elongated material approaches failure. This latter tendency is most evident when the branching index is less than about 0.8.

The melt tension and extensibility provide an indication of the melt strength of the material. They are determined with a Gottfert Rheotens melt tension apparatus from Gottfert Inc. by measuring the tension of a strand of molten olefin polymer material in centi-newtons as follows: the polymer to be examined is extruded at at an extrusion rate of 0.13 cc/sec at an apparent shear rate of approximately 15 reciprocal seconds and temperature of from 160° C. to 200° C., through a capillary 20 mm long and 2 mm in diameter; the strand is then subjected to stretching using a drawing system with a constant acceleration rate based upon the particular material. The tension resulting from the above drawing is measured (in centi-newtons) The higher the melt tension means the greater the melt strength values which, in turn, are indicative of the particular material's strain hardening ability.

The irradiated olefin polymer materials of the present invention are substantially gel free, up to less than 15% gel, as determined by the hot-gel filtration test, wherein a 1% xylene solution at 135° C. is filtered through a 325 mesh stainless steel screen. Preferably, the irradiated olefin polymer material is gel-free, up to less than 3% gel. The non-irradiated propylene polymer material, component (B), of the present invention is selected from the group consisting essentially of:

(1) a random propylene terpolymer consisting essentially of:
  (a) from 84 to 98% propylene, preferably from about 90 to 95%, most preferably from about 92 to 94%,
  (b) from 1 to 10% ethylene, preferably from about 2 to 5%, most preferably from about 2.2 to 3%, and
  (c) about 1 to 15% of a $C_{4-8}$ alpha-olefin, preferably from about 4 to 10%, and most preferably from about 4.4 to 6%, wherein the total comonomer concentration of said propylene terpolymer is from about 4 to 15%;

(2) a propylene polymer composition consisting essentially of:
  (a) from 30 to 65%, preferably from about 45 to 65%, of a copolymer of propylene with a $C_{4-8}$ alpha-olefin, which contains from 80 to 98% propylene, and preferably from 85 to 95%, and
  (b) from about 35 to 70%, preferably from about 35 to 55%, of a copolymer of propylene with ethylene having an ethylene content of from 1 to 10%, preferably from 7 to 9%, or terpolymer of propylene with ethylene and a $C_{4-8}$ alpha-olefin having a total comonomer content, i.e of ethylene and a $C_{4-8}$ alpha-olefin, is from 2 to 10%, preferably 3 to 6%, and the ethylene content is preferably from 1 to 3%;

(3) a olefin polymer composition consisting essentially of:
  (a) from 10 to 50% of a propylene homopolymer, preferably from 10 to 40%, and most preferably from 20 to 35%, having an isotactic index of from 80 to greater than 99%, preferably from 85 to 99%, or a copolymer selected from the group consisting of (i) propylene and ethylene, (ii) propylene, ethylene and a $CH_2=CHR$ alpha-olefin, where R is a $C_{2-8}$ straight or branched alkyl, and (iii) propylene and an alpha-olefin, as defined above in (a)(ii), wherein said copolymer contains from 85 to 99%, and preferably from 90 to 99% propylene and having an isotactic index greater than 80 to 98%, preferably greater than 85 to 98%,
  (b) from 5 to 20% of a semi-crystalline, essentially linear copolymer fraction, preferably from 7 to 15%, having a crystallinity of about 20 to 60%, by differential scanning calorimetry (DSC), wherein the copolymer is selected from the group consisting of (i) ethylene and propylene containing over 55% ethylene; (ii) ethylene, propylene, and an alpha-olefin, as defined above in (a)(ii), containing from 1 to 10% of the alpha-olefin and over 55% up to 98%, preferably from 80 to 95%, of both ethylene and alpha-olefin; and (iii) ethylene and an alpha-olefin, as defined in (a)(ii), containing over 55% up to 98%, preferably from 80 to 95%, of said alpha-olefin, which copolymer is insoluble in xylene at room or ambient temperature, and
  (c) from 40 to 80% of a copolymer fraction preferably 50 to 70%, selected from the group consisting of a copolymer of (i) ethylene and propylene wherein the copolymer contains from 20% to less than 40%, preferably from 20 to 38%, most preferably 25 to 38% ethylene; (ii) ethylene, propylene, and an alpha-olefin, as defined in (a)(ii), wherein the alpha-olefin is present in an amount of from 1 to 10%, preferably from 1 to 5%, and the amount of ethylene and alpha-olefin present is from 20% to less than 40%; and (iii) ethylene and an alpha-olefin as defined in (a)(ii), containing from 20 to less than 40%, preferably 20 to 38%, and most preferably 25 to 38% of the alpha-olefin, and optionally with 0.5 to 10%, preferably 1 to 5% of a diene, said copolymer fraction being soluble in xylene at ambient temperature, and having an intrinsic viscosity preferably of from 1.7 to 3.0 dl/g, wherein the total amount of ethylene units or said alpha-olefin units in the olefin polymer composition, or of ethylene and said alpha-olefin units when both are present in the olefin polymer composition is from 15 to 35%, the total amount of (b) and (c) fractions, based on the total olefin polymer composition is preferably from about 65% to 80%, the weight ratio of (b)/(c) is preferably from 0.1 to about 0.3 and the total content of ethylene or $C_{4-8}$ alpha-olefin or combination thereof in (b+c) is less than 50%, and preferably from 20 to 45%; and (4) a mixture of the compositions of (B)(1), (B)(2) or (B)(3) with an olefin copolymer rubber selected from the group consisting of (i) an ethylene-propylene copolymer rubber having an ethylene content of from 40 to 90%, preferably from 50 to 85%, (ii) an ethylene-butene copolymer rubber having an ethylene content of from 50 to 90%, preferably from 55 to 85%, and (iii) an ethylene-propylene-conjugated diene terpolymer rubber having an ethylene content of 40 to 77%, preferably from 45 to 75%, and diene content of from 2 to 10%, preferably from 3 to 8%;

(5) a homopolymer of propylene or a random copolymer of propylene and an olefin selected from the group consisting of ethylene and $C_{4-10}$ alpha-olefins, provided that, when said olefin is ethylene, the maximum polymerized ethylene content is about 10%, preferably about 4%, and when said olefin is a $C_4$–$C_{10}$ alpha-olefin, the maximum polymerized alpha-olefin content is about 20%, preferably about 16% impact modified with from 5 to 60% of an ethylene-propylene copolymer rubber having an ethylene content of from 20 to 70%, or an ethylene-propylene-non-conjugated diene monomer rubber having a diene content of from 2 to 8% and an ethylene content of from 20 to 70%; and (6) a thermoplastic olefin consisting essentially of:
  (a) from 10 to 60% of a propylene homopolymer, preferably from 20 to 50%, having an isotactic index greater than 90, preferably greater than 98%, or a crystalline propylene copolymer with ethylene and/ or $C_{4-8}$ alpha-olefin having a propylene content greater than 85% and an isotactic index of greater than 85%;
  (b) from 30 to 60% of an amorphous ethylene-propylene copolymer fraction, preferably from 30 to 50%, optionally containing minor amount of a diene, which is xylene soluble at room temperature, and contains from 40 to 70% ethylene; and
  (c) from 8 to 40% of a semi-crystalline ethylene-propylene copolymer which is xylene insoluble at room temperature.

In said mixture of (B)(4), the propylene polymer material, (B)(1), (B)(2) or (B)(3), is present in an amount of from 95 to 25%, preferably from 85 to 40%, and most preferably from 75 to 50%, and the olefin copolymer rubber is present in an amount of from 5 to 75%, preferably from 15 to 60%, and most preferably from 25 to 50%.

In the composition of the present invention, Component (B) is present in an amount of from 90 to 10%, preferably, and most preferably from 80 to 20%.

The $C_4$–$C_{10}$ alpha-olefin useful in the preparation of the components of the above olefin polymer material and non-irradiated olefin polymer include butene-1, pentene-1, hexene-1, 4-methylpentene-1 and octene-1. Butene-1 is particularly preferred.

The diene, when present, is typically a butadiene, 1,4-hexadiene, 1,5-hexadiene, or ethylidene norbornene diene monomer.

The composition of component (A)(6), prior to radiation, and (B)(3) have at least one melt peak, determined by DSC, present at temperatures higher than 120° C., and at least one peak, relative to the vitreous transition, present at temperatures from −10° C. and −35° C. In addition, these compositions have a flexural modulus of less than 150 MPa, generally from 20 and 100 MPa; a tensile strength at yield of from 10 to 20 MPa, elongation at break over 400%; a tension set, at 75% strain, from 20% to 50%; a Shore D hardness from 20 and 35; haze value of less than 40%, preferably less than 35%, and do not break (no brittle impact failure) when an IZOD impact test is conducted at −50° C.

The composition of component (A)(8), prior to radiation, and (B)(6) have at least one melting peak, determined by DSC, present at temperatures higher than 140° C.; a flex modulus of less than 700 MPa, preferably from 200 to 500 MPa; a VICAT softening point greater than 50C; a Shore A hardness greater than 80 and a Shore D hardness greater than 30; a tension set, at 75% strain, lower than 60%, and preferably from 20 to 50%; a tensile stress of greater than 6 MPa, and preferably from 8 to 20 MPa.

The irradiated olefin polymer material of component (A), of the present invention, is prepared by (1) irradiating the olefin polymer material (a) in an environment in which the active oxygen concentration is established and maintained at less than about 15% by volume of said environment (b) with high energy ionizing radiation at a dose rate in the range from about 1 to about $1 \times 10^4$ megarads per minute for a period of time sufficient for a substantial amount of chain scission of the propylene polymer material to occur, but insufficient to cause gelation of the material; (2) maintaining the thus irradiated material in such an environment for a period of time sufficient for a significant amount of long chain branches to form; and (3) then treating the irradiated material while in such an environment to deactivate substantially all the free radicals present in the irradiated material.

The active oxygen content of the environment in which the three process steps are carried out is a critical factor. The expression "active oxygen" herein means oxygen in a form that will react with the irradiated material, and more particularly the free radicals in the material. It includes molecular oxygen (which is the form of oxygen normally found in air). The active oxygen content requirement of the process of this invention can be achieved by the use of vacuum or by replacing part or all of the air in the environment by an inert gas such as, for example, nitrogen.

Immediately after the olefin polymer is made it is normally substantially free of active oxygen. Therefore, it is within the concepts of this process to follow the polymerization and polymer work-up steps (when the olefin polymer material is not exposed to air) with the described radiation process. However, in most situations the olefin polymer material will have an active oxygen content because of having been stored in air, or for some other reason. Consequently, in the preferred practice of the process of this invention the finely divided, olefin polymer material is first treated to reduce its active oxygen content. A preferred way of doing this is to introduce the material into a bed of the same blown with nitrogen, the active oxygen content of which is equal to or less than about 0.004% by volume. The residence time of the material in the bed generally should be at least about 5 minutes for effective removal of active oxygen from the interstices of the particles of the material, and preferably long enough for the material to be in equilibrium with the environment.

Between this preparation step and the irradiation step, the prepared, olefin polymer material should be maintained in an environment in which the active oxygen concentration is less than about 15%, preferably less than 5% in a gas conveyance system, and more preferably 0.004%, by volume of the environment. In addition, temperature of the olefin polymer material should be kept above the glass transition temperature of the amorphous fraction of the material, if any is present, and because it usually is, generally at less than about 40° C and preferably at about 25° C., because of the increase in temperature of the material that occurs in the irradiation step.

In the irradiation step the active oxygen concentration of the environment preferably is less than about 5% by volume and more preferably less than about 1% by volume. The most preferred concentration of active oxygen is 0.004% by volume.

In the irradiation step, the ionizing radiation should have sufficient energy to penetrate to the extent desired the mass of olefin polymer material being radiated. The energy must be sufficient to ionize the molecular structure and to excite atomic structure, but not sufficient to affect atomic nuclei. The ionizing radiation can be of any kind but the most practical kinds comprise electrons and gamma rays. Preferred are electrons beamed from an electron generator having an accelerating potential of 500–4,000 kilovolts. In the case of propylene polymer material without a polymerized diene content, satisfactory results are obtained at a dose of ionizing radiation of about 1–12 megarads, preferably 3–8 megarads, delivered generally at a dose rate of about 1–10,000 megarads per minute, and preferably about 18–2,000 megarads per minute. In the case of ethylene homopolymer and olefin polymer material having a polymerized diene content, satisfactory results are obtained with a dose of about 0.20 megarad—about 2.0 megarads, preferably about 0.5 megarad—1.5 megarads, delivered at the foregoing dose rates.

The term "rad" is usually defined as that quantity of ionizing radiation that results in the absorption of 100 ergs of energy per gram of irradiated material, regardless of the source of radiation. As far as the instant invention is concerned, the amount of energy absorbed by the olefin polymer material when it is irradiated usually is not determined. However, in the usual practice of the process energy absorption from ionizing radiation is measured by the well known conventional dosimeter, a measuring device in which a strip of fabric containing a radiation sensitive dye is the energy absorption sensing means. Hence, as used in this specification the term "rad" means that quantity of ionizing radiation resulting in the absorption of the equivalent of 100 ergs of energy per gram of the fabric of a dosimeter placed at the surface of the olefin polymer material being irradiated, whether in the form of a bed or layer of particles, or a film, or a sheet.

The second step of the process should be performed in a period of time generally in the range from about one minute to about one hour, and preferably about 2–30 minutes. A minimum time is needed for sufficient migration of olefin polymer chain fragments to free radical sites and for combination there at to reform complete chains, or to form long branches on chains. A radical migration time less than one minute, for example, about a half minute, is within the broader concepts of this invention, but is not preferred because the amount of resulting free-end long chain branching is quite low.

In the final step of the process, the free radical deactivation or quenching step, can be performed by the application of heat, generally from at least 60° C. to about 280° C. or by the addition of an additive that functions as a free radical trap, such as, for example, methyl mercaptan.

In the process the application of heat comprises melt extruding the irradiated olefin polymer material. At this temperature the irradiated olefin polymer material is melted. As a result, quenching of the free radicals is substantially complete. Prior to the extrusion or melt compounding, the irradiated olefin polymer material can be blended with other polymers, if desired, and additives such as, for example, stabilizers, pigments, fillers, and the like. Alternatively, such additives can be incorporated as a side stream addition to the extruder.

In the alternative, the application of heat can be achieved by introducing the irradiated olefin polymer material into a fluidized bed or a staged fluid bed system in which the fluidizing medium is, for example, nitrogen or other inert gas. The bed or beds is or are established and maintained in a temperature range of at least about 60° C. up to a temperature which does not exceed the melting point of the polymer, with the average residence time of the irradiated olefin polymer material in the fluid bed or beds being from about 5 minutes to about 120 minutes, with about 20–30 minutes being optimum.

The product thus obtained is a normally solid, high molecular weight, olefin polymer material characterized by strain hardening.

Although the radiation process can be carried out on a batch basis, preferably it is performed on a continuous basis. In the continuous process the finely divided, olefin polymer material either with or without the preparation step, depending on the active oxygen content of the material, is layered on a traveling belt in the required environment. The thickness of the layer depends on the desired extent of penetration of the ionizing radiation into the layer and the proportion of olefin polymer material desired in the final end product. The speed of travel of the traveling belt is selected so that the layer of finely divided, propylene polymer material passes through the beam or beams of ionizing radiation at a rate to receive the desired dose of ionizing radiation. After having received the desired dose of ionizing radiation, the irradiated layer can be left on the traveling belt in said environment for the period of time for free-radical migration and combination to occur, and then removed from the belt, and introduced into an extruder operated at a melt temperature of the irradiated material, or, alternatively, introduced into a heated bed, or a staged system of heated beds, of particles of irradiated material fluidized with nitrogen or other inert gas. In either case, the irradiated material after at least substantially all of the free radicals therein are deactivated is discharged into the atmosphere and quickly cooled to room temperature. Alternatively, the irradiated, olefin polymer material is discharged from the belt and conveyed in the required environment to a holding vessel, the interior of which has the required environment, and held in the vessel to complete the requisite free radical migration time. The irradiated material then is introduced into an extruder operated at a melt temperature of the irradiated material or is introduced into a heated, inert gas fluidized bed, or a staged system of fluidized beds, of irradiated particles of olefin polymer material and, after quenching of the free radicals, the irradiated olefin polymer is discharged into the atmosphere.

The compounding or melt blending of component (A) and component (B), as defined above, of the present invention can be carried out on an open roll, in an internal mixer (e.g., Banbury or Haake mixers), and single-screw or twin-screw extruders.

The polyolefin composition of the present invention may also contain other conventional additives, for example, antioxidants, stabilizers, extender oils, such as paraffinic and naphthenic oils; fillers, such as $CaCO_3$, talc and zinc oxide; or flame retardants.

The present invention will be illustrated in greater detail with reference to the examples of the invention set forth below. The test samples and physical properties of the following working examples and comparative examples were prepared and measured according to the following methods:

| | |
|---|---|
| Gloss 60° | ASTM D-523-85 |
| Shore A | ASTM D-2240 |
| Shore D | ASTM D-2240 |
| Melt Flow Rate (MFR) | ASTM D-1238, Condition L |

The ingredients used in the preparation of the compositions of this invention illustrated in the examples that follow are:

Polymer A—an irradiated olefin polymer composition, containing 37% of a propylene-ethylene copolymer, (96.7:3.3 wt. ratio of polymerized units), and 63% of an ethylene-propylene copolymer, (29:71 wt. ratio of polymerized units), pelletized, then radiated with 6 Mrad, the resulting irradiated composition having a MFR of 0.4 dg/min., a melt tension of 23.6, an extensibility of 1.6 and an intrinsic viscosity of 2.55.

Polymer B—a non-irradiated olefin polymer composition, containing 37% of a propylene-ethylene copolymer, (96.7:3.3 wt. ratio of polymerized units), and 63% of an ethylene-propylene copolymer, (29:71 wt. ratio of polymerized units), pelletized form, having a MFR of 0.6 dg/min.

Polymer C—an irradiated random propylene-ethylene copolymer containing 96.6% of propylene and 3.3% ethylene, pelletized, then radiated with 7.5 Mrad, the resulting irradiated composition having a melt tension of 12.8, an extensibility of 11.6 and an intrinsic viscosity of 2.1.

Polymer D—an irradiated random propylene-ethylene copolymer containing 96.6% of propylene and 3.3% ethylene, pelletized, then radiated with 12 Mrad, the resulting irradiated composition having a melt tension of 9.0, an extensibility of 7.1 and an intrinsic viscosity of 1.76.

Polymer E—an irradiated random propylene-ethylene copolymer containing 96.8% of propylene and 3.23% ethylene, pelletized, then radiated with 4.5 Mrad, the resulting irradiated composition having a melt tension of 22.2, an extensibility of 3.0 and an intrinsic viscosity of 2.8.

Polymer F—an irradiated propylene homopolymer, pelletized and then radiated with 9 Mrad, the resulting irradiated composition having a melt tension of 16.5 and an intrinsic viscosity of 2.0.

Polymer G—a non-irradiated Epsyn P597 ethylene-propylene-ethylidene 2-norbornene terpolymer rubber, containing 63% ethylene and 2.3% diene, extended with 100 phr paraffinic process oil, ML 1+4 @ 125° C.=52, from Copolymer Rubber & Chemical Corporation.

Stabilizer 1—Irganox B 225 2,2-bis[[3-[3,5-Bis(1,1-dimethylethyl)-4-hydroxyphenyl]-1-oxopropoxy]methyl]-1,3-propanediyl-3,5-bis(1,1-dimethylethyl)-4-hydroxybenzenepropanoate stabilizer and tris(2,4-di-tert-butylphenyl)phosphite stabilizer in a 50:50 blend.

Stabilizer 2—Irganox 1010 2,2-bis[[3[3,5-bis(1,1-dimethylethyl)-4-hydroxyphenyl]-1-oxopropoxy]methyl]-1,3-propanediyl-3,5-bis(1,1-dimethylethyl)-4-hydroxybenzenepropanoate stabilizer.

Stabilizer 3—Irganox 1076 octadecyl 3-(3', 5'-di-tert-butyl-4'-hydroxyphenyl)propanoate stabilizer.

Stabilizer 4—Irgafos 168 tris(2,4-di-tert-butylphenyl)phosphite stabilizer.

Stabilizer 5—Tinuvin 770 bis(2,2,6,6-pentamethyl-4-piperidinyl)sebacate stabilizer.

Stabilizer 6—Chimassorb 944FL N,N'-bis(2,2,6,6-tetramethyl-4-piperidinyl)-1,6-hexanediamine polymer with 2,4,6-trichloro-1,3,5-trazine and 2,4,4-trimethyl-1,2-pentanamine stabilizer.

Stabilizer 7—Ferro AM-340 2,4-di-tert-butylphenyl-3,5-di-tert-butyl-4-hydroxybenzoate stabilizer.

Colonial 3063 carbon black.

EXAMPLE 1

A polyolefin composition of the present invention is produced by a general procedure comprising blending (A) Polymer A in spherical form, containing 37% of a propylene-ethylene copolymer, (3.3 wt.% of polymerized ethylene units), and 63% of an ethylene-propylene copolymer, (29:71 wt. ratio of polymerized units), which has been pelletized and then radiated with 6 Mrad, the resulting irradiated material having a MFR of 0.4 dg/min., a melt tension of 23.6 and intrinsic viscosity of 2.55, and (B) Polymer (B) in spherical form, containing 37% of a propylene-ethylene copolymer, (3.3 wt.% of polymerized ethylene units), and 63% of an ethylene-propylene copolymer, (29:71 wt. ratio of polymerized units), which has been pelletized and has a MFR of 0.6 dg/min., until a homogeneous mixture is obtained.

The compounded mixture is injection molded on a 3 ounce, Van Dorn injection molding machine with a barrel temperature of 440° C. and a water cooled, mold temperature of 75° F. to prepare 6"×4"×0.125' plaques.

The gloss and Shore A properties are set forth in Table 1.

Control 1

A polyolefin composition was prepared according to the general procedure of Example 1, except that the composition did not contain Polymer (A).

The gloss and Shore A properties are set forth in Table 1.

EXAMPLES 2 to 4

The compositions of examples 2 to 4 were prepared according to the general procedure of example 1, except that the amounts of components (A) and (B) were varied as set forth in Table 1.

The gloss and Shore A properties of the compositions are set forth in Table 1.

TABLE 1

| | Con. 1 | Ex. 1 | Ex. 2 | Ex. 3 | Ex. 4 |
|---|---|---|---|---|---|
| Ingredients | | | | | |
| Polymer A, % | — | 20 | 40 | 60 | 80 |
| Polymer B, % | 100 | 80 | 60 | 40 | 20 |
| Properties | | | | | |
| 60° Gloss | 84.9 | 62.5 | 42.0 | 27.3 | 35.0 |
| Shore A | 94.5 | 94.5 | 94.7 | 94.8 | 94.7 |

As shown in Table 1, the compositions of the present invention which contain irradiated olefin polymer material and non-irradiated propylene polymer material reduced the gloss by at least 20%, as compared to control 1 which contained only non-irradiated propylene polymer material.

EXAMPLE 5

The composition of Example 5 is prepared according to the general method use for the composition of Example 1, except that 50% of irradiated olefin polymer and 50% non-irradiated propylene polymer was used.

Illustrated in Table 2 are sheets and thermoformed cups prepared from the compositions Examples 1 and 5 of the present invention and Control 1.

Sheets having a 40 mil thickness were prepared by extruding the compositions on a 1.75" Prodex extruder with a 9" die.

Some of the sheets thus formed were used in a conventional thermoforming operation to form cups. A thermoformer that is a Labform 1B equipped with an aluminum plug-cup mold, 3" diameter and 2" deep, was used. Cups formed were used to measure the gloss reduction inside the cup, away from the mold, and gloss reduction outside the cup, next to the mold. The following thermoforming conditions were used:

| Oven heater temperature top and bottom | 540° F. |
|---|---|
| Vacuum | 25–26 in. of Hg |
| Heating time | 1 minute |
| Mold temperature | 150° F. |

The gloss and shore A results are shown in Table 2.

TABLE 2

|  | Con. 1 | Ex. 1 | Ex. 5 |
|---|---|---|---|
| Ingredients |  |  |  |
| Polymer A, % | — | 17 | 50 |
| Polymer B, % | 100 | 83 | 50 |
| Properties 40 mil sheet |  |  |  |
| 60° Gloss | 28.1 | 8.0 | 5.4 |
| Shore A | 93.7 | 94.3 | 94.0 |
| Thermoformed Cups |  |  |  |
| 60° Gloss[1] | 18.2 | 5.3 | 7.2 |
| 60° Gloss[2] | 27.6 | 7.4 | 8.3 |

[1]Away from the mold (inside of cup).
[2]Next to the mold (outside of cup).

At least a 50% reduction in gloss is obtained in the sheets and thermoformed cups prepared from the compositions of the present invention as compared to the composition of control 1.

EXAMPLE 6–13

The compositions containing the ingredients set forth in Table 3 were prepared according to the general method used for the composition of Example 1.

The compositions were physically blended, pelletized, and then extruded into 75 mil sheets on a 3.5", 32/1 L/D extruder with a 54" die. The thermoformed cups were prepared from the sheets thus prepared according the method described above.

TABLE 3

|  | Examples |  |  |  |  |  |  |  |
|---|---|---|---|---|---|---|---|---|
|  | 6 | 7 | 8 | 9 | 10 | 11 | 12 | 13 |
| Ingredients |  |  |  |  |  |  |  |  |
| Polymer B, % | 76.8 | 86.4 | 75.2 | 84.6 | 75.2 | 84.6 | 76.8 | 86.4 |
| Polymer C, % | — | — | 18.7 | 9.3 | — | — | 19.2 | 9.6 |
| Polymer D, % | — | — | — | — | 18.7 | 9.3 | — | — |
| Polymer E, % | 19.2 | 9.6 | — | — | — | — | — | — |
| Stabilizer 1 | 0.2 | 0.2 | — | — | — | — | 0.2 | 0.2 |
| Stabilizer 2 | — | — | 0.2 | 0.2 | 0.2 | 0.2 | — | — |
| Stabilizer 3 | — | — | 0.5 | 0.5 | 0.5 | 0.5 | — | — |
| Stabilizer 4 | — | — | 0.2 | 0.2 | 0.2 | 0.2 | — | — |
| Stabilizer 5 | — | — | 0.2 | 0.2 | 0.2 | 0.2 | — | — |
| Stabilizer 6 | — | — | 0.4 | 0.4 | 0.4 | 0.4 | — | — |
| Stabilizer 7 | — | — | 0.4 | 0.4 | 0.4 | 0.4 | — | — |
| Calcium Stearate | — | — | 0.4 | 0.4 | 0.4 | 0.4 | — | — |
| Carbon Black | 3.8 | 3.8 | 3.8 | 3.8 | 3.8 | 3.8 | 3.8 | 3.8 |
| Properties |  |  |  |  |  |  |  |  |
| 60° Gloss[1] | 9 | 10 | 8 | 13 | 11 | 15 | 11 | 1 |
| 60° Gloss[2] | 8 | 10 | 10 | 11 | 9 | 8 | 9 | 11 |
| Shore A | 95 | 94 | 95 | 94 | 95 | 94 | 95 | 94 |

[1]Away from the mold (inside of cup).
[2]Next to the mold (outside of cup).

As shown in Table 3, the compositions of the present invention which contain the irradiated olefin polymer material and non-irradiated propylene polymer material a reduction in gloss is obtained.

EXAMPLE 14–20

The compositions containing the ingredients set forth in Table 4 were mixed in a 1100 gram batch size Banbury at 320° F. for three minutes. The mix was into sheets, cut into strips and ground into pellet sized particles, then injection molded into plaques according to the general method described in Example 1.

TABLE 4

|  | Control | Examples |  |  |  |  |  |  |
|---|---|---|---|---|---|---|---|---|
|  | 1 | 14 | 15 | 16 | 17 | 18 | 19 | 20 |
| Ingredients |  |  |  |  |  |  |  |  |
| Polymer B, % | 54.8 | 14.9 | 32.9 | 14.9 | 32.9 | 43.9 | 14.9 | 32.9 |
| Polymer G, % | 44.9 | 44.9 | 26.9 | 44.9 | 26.9 | 35.9 | 44.9 | 26.9 |
| Polymer A, % | — | 39.9 | 39.9 | — | — | — | — | — |
| Polymer E, % | — | — | — | — | — | 19.9 | 39.9 | 39.9 |
| Polymer F, % | — | — | — | 39.9 | 39.9 | — | — | — |
| Stabilizer 1 | 0.3 | 0.3 | 0.3 | 0.3 | 0.3 | 0.3 | 0.3 | 0.3 |
| Properties |  |  |  |  |  |  |  |  |
| 60° Gloss | 35 | 12 | 18 | 12 | 23 | 21 | 15 | 18 |
| Shore A | 75 | 77 | 85 | 95 | 95 | 89 | 92 | 94 |

As demonstrated in Table 4, at least a 50% reduction in gloss was obtained with the compositions of the present invention containing a irradiated olefin polymer material, a non-irradiated propylene polymer material and an olefin rubber as compared to the composition containing non-irradiated propylene polymer material and olefin copolymer rubber.

The polyolefin composition of this invention also provides improved retention of embossing definition commonly referred to as grain retention, when the composition is extruded and embossed, with or without subsequently thermoforming.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. A polyolefin composition consisting of (A) from 5 to 95% of an irradiated, normally solid, high molecular weight, olefin polymer material having a long chain branching strain hardening elongational viscosity, and a melt tension greater than or equal to 9 selected from the group consisting essentially of:

(1) a homopolymer of propylene;

(2) a ethylene polymers selected from the group consisting essentially of:
  (i) homopolymers of ethylene having a density of 0.960 g/cm$^3$ or greater;
  (ii) random copolymers of ethylene and an alpha-olefin selected from the group consisting of $C_3$–$C_{10}$ alpha-olefins having a polymerized alpha-olefin content of about 20%, and having a density of 0.91 g/cm$^3$ or greater but less than 0.94 g/cm$^3$; and
  (iii) random terpolymers of ethylene and $C_3$–$C_{10}$ alpha-olefins, provided that the maximum polymerized alpha-olefin content is about 20%;

(3) a random copolymer of propylene and an olefin selected from the group consisting of ethylene and $C_{4-10}$ alpha-olefins provided that, when ethylene is said olefin, the maximum polymerized ethylene content is about 5%, and when said olefin is a $C_{4-10}$ alpha-olefin, the maximum polymerized alpha-olefin content is about 20%;

(4) a random propylene terpolymer consisting essentially of:
  (a) from 85 to 98% propylene,
  (b) from 1 to 10% ethylene, and
  (c) about 1 to 15% of a $C_{4-8}$ alpha-olefin, wherein the total comonomer concentration in said propylene terpolymer is up to 15%;

(5) a propylene polymer composition consisting essentially of:
  (a) from 30 to 65% of a copolymer of propylene with a $C_{4-8}$ alpha-olefin, which contains from 80 to 98% propylene, and
  (b) from about 35 to 70% of a copolymer of propylene with ethylene having an ethylene content of from 1 to 10%, or a terpolymer of propylene with ethylene and a $C_{4-8}$ alpha-olefin having a total comonomer content of from 2 to 10% and ethylene content of from 1 to 3%;

(6) a olefin polymer composition consisting essentially of:
  (a) from 10 to 50% of a propylene homopolymer having an isotactic index preferably from 85 to 98%, or a copolymer selected from the group consisting of (i) propylene and ethylene, (ii) propylene, ethylene and a $CH_2$=CHR alpha-olefin, where R is a $C_{2-8}$ straight or branched alkyl, and (iii) propylene and an alpha-olefin, as defined above in (a)(ii),
  (b) from 5 to 20% of a semi-crystalline, essentially linear copolymer fraction having a crystallinity of about 20 to 60%, by differential scanning calorimetry (DSC), wherein the copolymer is selected from the group consisting of (i) ethylene and propylene containing over 55% ethylene; (ii) ethylene, propylene, and an alpha-olefin, as defined above in (a)(ii), containing from 1 to 10% of the alpha-olefin and over 55% up to 98%, of both ethylene and alpha-olefin; and (iii) ethylene and an alpha-olefin, as defined in (a)(ii), containing over 55% up to 98% of said alpha-olefin, which copolymer is insoluble in xylene at room or ambient temperature, and
  (c) from 40 to 80% of a copolymer fraction selected from the group consisting of a copolymer of (i) ethylene and propylene wherein the copolymer contains from 20% to less than 40% ethylene; (ii) ethylene, propylene, and an alpha-olefin, as defined in (a)(ii), wherein the alpha-olefin is present in an amount of from 1 to 10%, and the amount of ethylene and alpha-olefin present is from 20% to less than 40%; and (iii) ethylene and an alpha-olefin, as defined in (a)(ii), containing from 20 to less than 40% of the alpha-olefin, and optionally with 0.5 to 10% of a diene, said copolymer fraction being soluble in xylene at ambient temperature, and having an intrinsic viscosity of from 1.7 to 3.0 dl/g, wherein the total amount of (b) and (c) fractions based on the total olefin polymer composition is from about 65% to 80%, the weight ratio of (b)/(c) is from 0.1 to about 0.3, and the total content of ethylene or $C_{4-8}$ alpha-olefin or combination thereof in (b+c) is less than 50%;

(7) a homopolymer of propylene or a random copolymer of propylene and an olefin selected from the group consisting of ethylene and $C_{4-10}$ alpha-olefins, provided that, when said olefin is ethylene, the maximum polymerized ethylene content is up to 10%, and when said olefin is a $C_4$–$C_{10}$ alpha-olefin, the maximum polymerized alpha-olefin content is up to 20%, impact modified with from 5 to 60% of an ethylene-propylene copolymer rubber having an ethylene content of from 20 to 70%, or an ethylene-propylene-non-conjugated diene monomer rubber having a diene content of from 2 to 8% and an ethylene content of from 20 to 70%;

(8) a thermoplastic olefin consisting essentially of:
  (a) from 10 to 60% of a propylene homopolymer, having an isotactic index greater than 90, or a crystalline propylene copolymer with ethylene and/ or $C_{4-8}$ alpha-olefin having a propylene content greater than 85% and an isotactic index of greater than 85%;
  (b) from 30 to 60% of an amorphous ethylene-propylene copolymer fraction, optionally containing minor amount of a diene, which is xylene soluble at room temperature, and contains from 40 to 70% ethylene; and
  (c) from 8 to 40% of a semi-crystalline ethylene-propylene copolymer which is xylene insoluble at room temperature; and (9) mixtures thereof, and (B) from 95 to 5% of a non-irradiated propylene polymer material selected from the group consisting essentially of:

(3) a olefin polymer composition consisting essentially of:
  (a) from 10 to 50% of a propylene homopolymer having an isotactic index of from 85 to 98%, or a copolymer selected from the group consisting of (i) propylene and ethylene, (ii) propylene, ethylene and a $CH_2$=CHR alpha-olefin, where R is a $C_{2-8}$ straight or branched alkyl, and (iii) propylene and an alpha-olefin, as defined above in (a)(ii),
  (b) from 5 to 20% of a semi-crystalline, essentially linear copolymer fraction having a crystallinity of about 20 to 60%, by differential scanning calorimetry (DSC), wherein the copolymer is selected from the group consisting of (i) ethylene and propylene containing over 55% ethylene; (ii) ethylene, propylene, and an alpha-olefin, as defined above in (a)(ii), containing from 1 to 10% of the alpha-olefin and over 55% up to 98%, of both ethylene and alpha-olefin; and (iii) ethylene and an alpha-olefin, as defined in (a)(ii), containing over 55% up to 98% of said alpha-olefin, which copolymer is insoluble in xylene at room or ambient temperature, and (c) from 40 to 80% of a copolymer fraction selected from the group consisting of a copolymer of (i) ethylene and propylene wherein the copolymer contains from 20% to less than 40% ethylene; (ii) ethylene, propylene, and an alpha-olefin, as defined in (a)(ii), wherein the alpha-olefin is present in an amount of from 1 to 10%, and the amount of ethylene and alpha-olefin present is from 20% to less than 40%; and (iii) ethylene and an alpha-olefin, as defined in (a)(ii), containing from 20 to less than 40% of the alpha-olefin, and optionally with 0.5 to 10% of a diene, said copolymer fraction being soluble in xylene at ambient temperature, and having an intrinsic viscosity of from 1.7 to 3.0 dl/g, wherein the total amount of (b) and (c) fractions, based on the total olefin polymer composition is from about 65% to 80%, the weight ratio of (b)/(c) is from 0.1 to about 0.3, and the total content of ethylene or $C_{4-8}$ alpha-olefin or combination thereofin (b+c) is less than 50%;

(4) a mixture with an olefin copolymer rubber selected from the group consisting of (i) an ethylene-propylene copolymer rubber having an ethylene content of from 40 to 90%, (ii) an ethylene-butene copolymer rubber having an ethylene content of from 50 to 90%, and (iii) an ethylene-propylene-conjugated diene terpolymer rubber having an ethylene content of 40 to 77%, and diene content of from 2 to 10%; and (6) a thermoplastic olefin consisting essentially of:
(a) from 10 to 60% of a propylene homopolymer having an isotactic index greater than 90, or a crystalline propylene copolymer with ethylene and/or $C_{4-8}$ alpha-olefin having a propylene content greater than 85% and an isotactic index of greater than 85%;
(b) from 30 to 60% of an amorphous ethylene-propylene copolymer fraction, optionally containing minor amount of a diene, which is xylene soluble at room temperature, and contains from 40 to 70% ethylene; and
(c) from 8 to 40% of a semi-crystalline ethylene-propylene copolymer containing greater than 50% ethylene and is xylene insoluble at room temperature.

2. The composition of claim 1, wherein said irradiated olefin polymer material is (A)(1) or (A)(3) or (A)(5).

3. The composition of claim 2, wherein said irradiated olefin polymer material is (A)(1).

4. The composition of claim 2, wherein said irradiated olefin polymer material is (A)(3).

5. The composition of claim 2, wherein said irradiated olefin polymer material is (A)(5).

6. The composition of claim 1, wherein said nonirradiated propylene polymer material is (B)(3).

7. The composition of claim 1, wherein said nonirradiated propylene polymer material is (B)(4).

8. The composition of claim 1, wherein (B)(4) is a mixture of (B)(3) and an ethylene-propylene copolymer rubber or an ethylene-propylene-non-conjugated diene terpolymer rubber.

9. The composition of claim 1, wherein said nonirradiated propylene polymer material is (B)(6).

10. The composition of claim 1, consisting essentially of (A)(3) and (B)(3).

11. The composition of claim 1, consisting essentially of (A)(3) and (B)(6).

12. The composition of claim 1, consisting of (A)(6) and (B)(3).

13. The composition of claim 1, consisting essentially of (A)(6) and (B)(6).

14. The composition of claim 1, consisting essentially of (A)(6) and (B)(4), wherein (B)(4) is a mixture of (B)(3) and an ethylene-propylene-non-conjugated diene terpolymer rubber.

15. The composition of claim 1, consisting essentially of (A)(1) and (B)(4), wherein (B)(4) is a mixture of (B)(3) and an ethylene-propylene-non-conjugated diene terpolymer rubber.

16. The composition of claim 1, consisting essentially of (A)(3) and (B)(4), wherein (B)(4) is a mixture of (B)(3) and an ethylene-propylene-non-conjugated diene terpolymer rubber.

17. The composition of claim 1, consisting essentially of from 20 to 80% of component (A) and from 80 to 20% of component (B).

18. A thermoformed sheet prepared from a polyolefin composition consisting of (A) from 5 to 95% of an irradiated, normally solid, high molecular weight, olefin polymer material having a long chain branching strain hardening elongational viscosity and a melt tension greater than or equal to 9.0, selected from the group consisting essentially of:

(1) a homopolymer of propylene;
(2) a ethylene polymers selected from the group consisting essentially of:
(i) homopolymers of ethylene having a density of 0.960 g/cm³ or greater;
(ii) random copolymers of ethylene and an alpha-olefin selected from the group consisting of $C_3$–$C_{10}$ alpha-olefins having a polymerized alpha-olefin content of about 20%, and having a density of 0.91 g/cm³ or greater but less than 0.94 g/cm³; and
(iii) random terpolymers of ethylene and $C_3$–$C_{10}$ alpha-olefins, provided that the maximum polymerized alpha-olefin content is about 20%;

(3) a random copolymer of propylene and an olefin selected from the group consisting of ethylene and $C_{4-10}$ alpha-olefins provided that, when ethylene is said olefin, the maximum polymerized ethylene content is about 5%, and when said olefin is a $C_{4-10}$ alpha-olefin, the maximum polymerized alpha-olefin content is about 20%;

(4) a random propylene terpolymer consisting essentially of:
(a) from 85 to 98% propylene,
(b) from 1 to 10% ethylene, and
(c) about 1 to 15% of a $C_{4-8}$ alpha-olefin, wherein the total comonomer concentration in said propylene terpolymer is up to 15%;

(5) a propylene polymer composition consisting essentially of:
(a) from 30 to 65% of a copolymer of propylene with a $C_{4-8}$ alpha-olefin, which contains from 80 to 98% propylene, and
(b) from about 35 to 70% of a copolymer of propylene with ethylene having an ethylene content of from 1 to 10%, or a terpolymer of propylene with ethylene and a $C_{4-8}$ alpha-olefin having a total comonomer content of from 2 to 10% and ethylene content of from 1 to 3%;

(6) a olefin polymer composition consisting essentially of:
   (a) from 10 to 50% of a propylene homopolymer having an isotactic index preferably from 85 to 98%, or a copolymer selected from the group consisting of (i) propylene and ethylene, (ii) propylene, ethylene and a $CH_2=CHR$ alpha-olefin, where R is a $C_{2-8}$ straight or branched alkyl, and (iii) propylene and an alpha-olefin, as defined above in (a)(ii),
   (b) from 5 to 20% of a semi-crystalline, essentially linear copolymer fraction having a crystallinity of about 20 to 60%, by differential scanning calorimetry (DSC), wherein the copolymer is selected from the group consisting of (i) ethylene and propylene containing over 55% ethylene; (ii) ethylene, propylene, and an alpha-olefin, as defined above in (a)(ii), containing from 1 to 10% of the alpha-olefin and over 55% up to 98%, of both ethylene and alpha-olefin; and (iii) ethylene and an alpha-olefin, as defined in (a)(ii), containing over 55% up to 98% of said alpha-olefin, which copolymer is insoluble in xylene at room or ambient temperature, and
   (c) from 40 to 80% of a copolymer fraction selected from the group consisting of a copolymer of (i) ethylene and propylene wherein the copolymer contains from 20% to less than 40% ethylene; (ii) ethylene, propylene, and an alpha-olefin, as defined in (a)(ii), wherein the alpha-olefin is present in an amount of from 1 to 10%, and the amount of ethylene and alpha-olefin present is from 20% to less than 40%; and (iii) ethylene and an alpha-olefin, as defined in (a)(ii) containing from 20 to less than 40% of the alpha-olefin, and optionally with 0.5 to 10% of a diene, said copolymer fraction being soluble in xylene at ambient temperature, and having an intrinsic viscosity of from 1.7 to 3.0 dl/g, wherein the total amount of (b) and (c) fractions, based on the total olefin polymer composition is from about 65% to 80%, the weight ratio of (b)/(c) is from 0.1 to about 0.3, and the total content of ethylene or $C_{4-8}$ alpha-olefin or combination thereof in (b+c) is less than 50%;

(7) a homopolymer of propylene or a random copolymer of propylene and an olefin selected from the group consisting of ethylene and $C_{4-10}$ alpha-olefins, provided that, when said olefin is ethylene, the maximum polymerized ethylene content is up to 10%, and when said olefin is a $C_4$–$C_{10}$ alpha-olefin, the maximum polymerized alpha-olefin content is up to 20%, impact modified with from 5 to 60% of an ethylene-propylene copolymer rubber having an ethylene content of from 20 to 70%, or an ethylene-propylene-non-conjugated diene monomer rubber having a diene content of from 2 to 8% and an ethylene content of from 20 to 70%;

(8) a thermoplastic olefin consisting essentially of:
   (a) from 10 to 60% of a propylene homopolymer, having an isotactic index greater than 90, or a crystalline propylene copolymer with ethylene and/or $C_{4-8}$ alpha-olefin having a propylene content greater than 85% and an isotactic index of greater than 85%;
   (b) from 30 to 60% of an amorphous ethylene-propylene copolymer fraction, optionally containing minor amount of a diene, which is xylene soluble at room temperature, and contains from 40 to 70% ethylene; and
   (c) from 8 to 40% of a semi-crystalline ethylene-propylene copolymer which is xylene insoluble at room temperature; and (9) mixtures thereof, and (B) from 95 to 5% of a non-irradiated propylene polymer material selected from the group consisting essentially of:

(3) a olefin polymer composition consisting essentially of:
   (a) from 10 to 50% of a propylene homopolymer having an isotactic index of from 85 to 98% or a copolymer selected from the group consisting of (i) propylene and ethylene, (ii) propylene, ethylene and a $CH_2=CHR$ alpha-olefin, where R is a $C_{2-8}$ straight or branched alkyl, and (iii) propylene and an alpha-olefin, as defined above in (a)(ii),
   (b) from 5 to 20% of a semi-crystalline, essentially linear copolymer fraction having a crystallinity of about 20 to 60%, by differential scanning calorimetry (DSC), wherein the copolymer is selected from the group consisting of (i) ethylene and propylene containing over 55% ethylene; (ii) ethylene, propylene, and an alpha-olefin, as defined above in (a)(ii), containing from 1 to 10% of the alpha-olefin and over 55% up to 98%, of both ethylene and alpha-olefin; and (iii) ethylene and an alpha-olefin, as defined in (a)(ii), containing over 55% up to 98% of said alpha-olefin, which copolymer is insoluble in xylene at room or ambient temperature, and
   (c) from 40 to 80% of a copolymer fraction selected from the group consisting of a copolymer of (i) ethylene and propylene wherein the copolymer contains from 20% to less than 40% ethylene; (ii) ethylene, propylene, and an alpha-olefin, as defined in (a)(ii), wherein the alpha-olefin is present in an amount of from 1 to 10%, and the amount of ethylene and alpha-olefin present is from 20% to less than 40%; and (iii) ethylene and an alpha-olefin, as defined in (a)(ii), containing from 20 to less than 40% of the alpha-olefin, and optionally with 0.5 to 10% of a diene, said copolymer fraction being soluble in xylene at ambient temperature, and having an intrinsic viscosity of from 1.7 to 3.0 dl/g, wherein the total amount of (b) and (c) fractions based on the total olefin polymer composition is from about 65% to 80%, the weight ratio of (b)/(c) is from 0.1 to about 0.3, and the total content of ethylene or $C_{4-8}$ alpha-olefin or combination thereof in (b+c) is less than 50%;

(4) a mixture of (B)(3) with an olefin copolymer rubber selected from the group consisting of (i) an ethylene-propylene copolymer rubber having an ethylene content of from 40 to 90%, (ii) an ethylene-butene copolymer rubber having an ethylene content of from 50 to 90%, and (iii) an ethylene-propylene-conjugated diene terpolymer rubber having an ethylene content of 40 to 77%, and diene content of from 2 to 10%;

(6) a thermoplastic olefin consisting essentially of:
   (a) from 10 to 60% of a propylene homopolymer having an isotactic index greater than 90, or a crystalline propylene copolymer with ethylene and/or $C_{4-8}$ alpha-olefin having a propylene content greater than 85% and an isotactic index of greater than 85%;
   (b) from 30 to 60% of an amorphous ethylene-propylene copolymer fraction, optionally containing minor amount of a diene, which is xylene soluble at room temperature, and contains from 40 to 70% ethylene; and
   (c) from 8 to 40% of a semi-crystalline ethylene-propylene copolymer containing greater than 50% ethylene and is xylene insoluble at room temperature.

* * * * *

UNITED STATES PATENT AND TRADEMARK OFFICE
CERTIFICATE OF CORRECTION

PATENT NO. : 5,508,318
DATED : April 16, 1996
INVENTOR(S) : Jerome P. Comer

It is certified that error appears in the above-indentified patent and that said Letters Patent is hereby corrected as shown below:

At col. 12, line 21, change "6" x 4" x 0.125' " to --6" x 4" x .125"--.

At col. 17, line 32, after "mixture" insert --of (B)(3)--.

Signed and Sealed this

Twenty-fourth Day of December, 1996

Attest:

BRUCE LEHMAN

*Attesting Officer*        *Commissioner of Patents and Trademarks*